United States Patent
Park et al.

(10) Patent No.: US 7,089,213 B2
(45) Date of Patent: **\*Aug. 8, 2006**

(54) SYSTEM AND METHOD FOR PRODUCING AND VERIFYING SECURE NEGOTIABLE INSTRUMENTS

(75) Inventors: Gregory Ernest Park, Stratham, NH (US); Timothy Patrick O'Hagan, Dover, NH (US)

(73) Assignee: Bottomline Technologies, Portsmouth, NH (US)

( * ) Notice: Subject to any disclaimer, the term of this patent is extended or adjusted under 35 U.S.C. 154(b) by 638 days.

This patent is subject to a terminal disclaimer.

(21) Appl. No.: 10/162,292

(22) Filed: Jun. 4, 2002

(65) Prior Publication Data

US 2003/0225704 A1 Dec. 4, 2003

(51) Int. Cl.
*G06F 17/60* (2006.01)

(52) U.S. Cl. .............. 705/62; 705/1; 705/64; 380/1; 713/176; 713/168

(58) Field of Classification Search ........... 705/1, 705/62, 64; 380/1; 713/176, 168
See application file for complete search history.

(56) References Cited

U.S. PATENT DOCUMENTS

| | | | |
|---|---|---|---|
| 4,321,672 A | 3/1982 | Braun et al. | |
| 5,594,225 A | 1/1997 | Botvin | |
| 6,058,380 A | 5/2000 | Anderson et al. | |
| 6,073,121 A * | 6/2000 | Ramzy | 705/45 |
| 6,164,528 A | 12/2000 | Hills et al. | |
| 6,170,744 B1 * | 1/2001 | Lee et al. | 235/380 |
| 6,181,814 B1 * | 1/2001 | Carney | 382/137 |
| 6,233,340 B1 | 5/2001 | Sandru | |
| 6,600,823 B1 | 7/2003 | Hayosh | |
| 6,611,598 B1 * | 8/2003 | Hayosh | 380/54 |
| 2002/0067827 A1 * | 6/2002 | Kargman | 380/54 |
| 2002/0174074 A1 | 11/2002 | Meadow et al. | |

FOREIGN PATENT DOCUMENTS

DE   WO9847264   * 10/1998

OTHER PUBLICATIONS http://citeseer.ist.psu.edu/cache/papers/cs/12605/http:zSzz-Szwww.livia.estmtl.cazSz~akoerichzSzicdar99.pdf/automatic-storage-retrieval-and.pdf, date unknown.*
David Messerchmitt RSA Asymetric Encryption.

* cited by examiner

*Primary Examiner*—James P. Trammell
*Assistant Examiner*—John M. Winter
(74) *Attorney, Agent, or Firm*—Timothy P. OHagan

(57) ABSTRACT

The present invention relates to producing and presenting negotiable instruments and, more specifically, to printing and presenting checks, which are resistant to forgery or fraud. The negotiable instrument comprises an encrypted numeric sequence and a one-way decryption key printed in MICR font upside down across the top face of the negotiable instrument for electronic reading by a MICR reader. The encrypted numeric sequence represents name of the payee of the negotiable instrument and the payment amount.

4 Claims, 4 Drawing Sheets

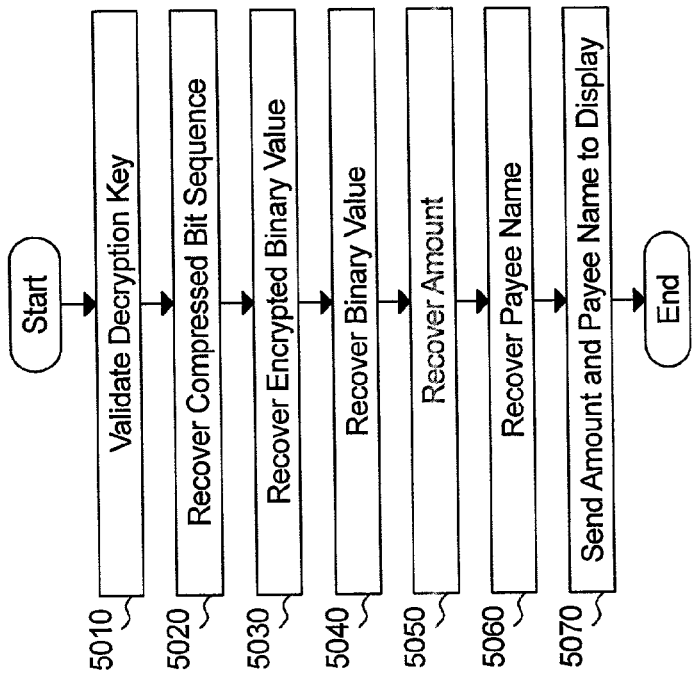

| ID Registered Payment Module | Assigned n | K Private | K Public | Account # |
|---|---|---|---|---|
| Company A | XXXXX | XXXXX | XXXXX | XXXXX |
| Company B | XXXXX | XXXXX | XXXXX | XXXXX |
| ⋮ | | | | |

Figure 6

| Valid K Public | n | Account # | Issuer ID |
|---|---|---|---|
| 1234567 | XXXXX | XXXXX | Company A |
| 8901234 | XXXXX | XXXXX | Company B |
| ⋮ | | | |

SYSTEM AND METHOD FOR PRODUCING AND VERIFYING SECURE NEGOTIABLE INSTRUMENTS

TECHNICAL FIELD

The present invention relates to producing and presenting negotiable instruments and, more specifically, to printing and presenting checks, which are resistant to forgery or fraud, due to the manner in which they are printed, the composition of the printed checks, and/or the codes used in connection with them.

BACKGROUND OF THE INVENTION

In the modern economy, monetary disbursements are often accomplished by the payer issuing a negotiable instrument, or check, to the payee. The advantages check disbursement systems are well-known. However, checks are subject to fraud, and check fraud is becoming more wide spread as access to more advanced graphic color printing, equipment, image scanning equipment and/or photocopying equipment becomes more wide spread. Such equipment can easily duplicate or counterfeit many known negotiable instrument anti-fraud systems that are based either printing the negotiable instrument on secure stock with a "printed watermark" or printing the negotiable instrument with a secure font that may include unusual character shapes, sizes, and or colorings that are not typically available to other than the payer.

Using such equipment, it is common for a dishonest payee to use such equipment to increase the amount of a check and/or to duplicate a check several times to fraudulently obtain money. It is also common for a third party to obtain a check and alter the name of the payee (and possibly increase the amount and/or duplicate a check) to fraudulently obtain money.

Without the use of positive payment systems, such fraud may not be discovered until the payer receives its account statement (or a notice that the account is overdrawn) and discovers payment on checks that were not actually issued. With the use of positive payment systems, the fraud can be detected when the bank holding the payer's checking account begins receiving checks that to not match the list of checks issued by the payer (e.g. the positive payment file delivered to the bank by the payer that lists at the amount, and check number of each check issued by the payee). At least two problems with use of positive pay systems are: 1) the positive pay file can be used to verify the amount of a check and prevent payment of duplicated checks with the same check number, but does not provide any verification that the name of the payee has not been altered; and 2) by the time the bank compares the check to the positive payment file and detects the fraud, it is likely that the person who created the fraudulent check has already received at least a portion of the payment amount in cash and can no longer be located for recourse.

A known attempt to reduce fraud involves computing a check digit based on check information and printing the check digit on the check or delivering the check digit to the bank holding the account on which the check is drawn as part of the positive payment file. When the check is presented, the bank could recomputed the check digit (using the same check digit computation function) with the information on the face of the check and compare the computed check digit with that printed on the face of the check. If there is a discrepancy between the computed check digit and the check digit printed on the face of the check, the bank would be alerted to the forgery and not accept the check. The problem with such system, similar to that of the positive pay file system, is that by the time the fraud is detected and the check dishonored, it is likely that the person who created the fraudulent check has already received at least a portion of the payment amount in cash and can no longer be located for recourse.

Similar systems have been proposed wherein a facility first accepting the check upon presentation could recompute the check digit (or other encrypted control code) using the information on the face of the check. Again, if the computed check digit or control code does not match that printed on the face of the check, the facility would be alerted to the potential fraud and not accept the check. The problem with such a system is that each facility to which the check could first be presented would need to have access to the algorithm for calculating the check digit or control code. Such wide spread dissemination of the algorithm would for compromise its security and a sophisticated forger could simply use the algorithm to reproduce check digit or code on the face of the forged check that matches the forged check information thereby defeating both systems.

Yet another enhancement to such a system would involve encoding the check information into a machine readable code on the face of the check for reading and decoding by the facility. However, again, the wide spread dissemination of the equipment and algorithm for decoding the check would for compromise its security and a sophisticated forger could simply use the algorithm to reproduce a machine readable code on the face of the forged check that matches the forged check information thereby defeating the system.

Thus, there continues to exist a need to improve negotiable instrument security that does not suffer the disadvantages of known systems.

SUMMARY OF THE INVENTION

A first aspect of the present invention is to provide a method for printing an unalterable negotiable instrument. The method comprises receiving payment information to include on the negotiable instrument, encrypting a representation of the payment information to generate an encrypted value utilizing an asymmetric algorithm and a first key, and printing the payment information, a representation of the encrypted value, and a second key on face of the negotiable instrument. The payment information may include a payee name and an amount. The second key may be different than the first key but mathematically related to the first key such that deciphering the encrypted value utilizing the asymmetric algorithm and the second key yields the representation of the pavement information.

The step of printing the payment information, a representation of the encrypted value, and the second key on the face of the negotiable instrument may comprise converting the encrypted value to a numeric character sequence comprising exclusively numerals and printing the payment information, the numeric character sequence, and the second key on face of the negotiable instrument. And, the step of printing the payment information, the character sequence, and the second key on the face of the negotiable instrument may comprise printing the character sequence and the second key in MICR font upside down across the top of the negotiable instrument.

The step of encrypting a representation of the payment information to an encrypted value may comprise compressing the payee name to generate the representation of the payment information. And, compressing the payee name may comprise truncating the payee name to a truncated payee name that comprises sequence of characters shorter than a sequence of characters representing the payee name and mapping each character of the truncated payee name to a limited character set.

A second aspect of the present invention is to provide a negotiable instrument. The negotiable instrument comprises: a) a payee name printed on the negotiable instrument; b) a payment amount printed on the negotiable instrument; c) an encrypted representation of the payee name and the payment amount printed on the negotiable instrument; and d) a decryption key printed on the negotiable instrument. The decryption key being: i) mathematically related to an encryption key that was used to generate the encrypted representation; ii) different than the encryption key, and iii) operating exclusively with an asymmetric algorithm for decryption of an encrypted value generated using the asymmetric algorithm and the encryption key.

The encrypted representation of the payee name and the payment amount may be a numeric character sequence comprising exclusively numerals and the numeric character sequence and the decryption key may be printed in MICR font upside down across the top of the negotiable instrument.

The encrypted representation of the payee may comprise an encrypted representation of a compressed representation of the payee name and the compressed representation of the payee name may consist of a truncated portion of the payee name.

A third aspect of the present invention is to provide a method of determining whether a payee name and a payee amount printed on a negotiable instrument has been altered. The method comprises reading an encrypted representation of a payee name and a payment amount from the negotiable instrument, reading a decryption key from the negotiable instrument, decrypting the encrypted numeric sequence to obtain a representation of the payee name and the payment amount; and generating a visible display of the representation of the payee name and the payment amount whereby the representation of the payee name and the payment amount may be compared to a payee name and a payment amount printed on the negotiable instrument. The decryption key may be: i) mathematically related to an encryption key that was used to generate the encrypted representation; ii) different than the encryption key, and iii) operating exclusively with an asymmetric algorithm for decryption of an encrypted value generated using the asymmetric algorithm and the encryption key.

The step of reading an encrypted representation and the step of reading a decryption key both comprise detecting MICR font that is printed representing upside down across the top of the negotiable instrument and represents the encrypted representation and decryption key.

For a better understanding of the present invention, together with other and further aspects thereof, reference is made to the following description, taken in conjunction with the accompanying drawings, and its scope will be pointed out in the appended clams.

BRIEF DESCRIPTION OF THE DRAWINGS

FIG. 4 is a table representing a limited character set in accordance with one embodiment of the present invention;

FIG. 5 is a flowchart representing operation of a verification module in accordance with one embodiment of the present invention;

FIG. 6 is a table representing an exemplary secure key source file in accordance with one embodiment of the present invention; and FIG. 7 is a table representing an exemplary decryption key verification file in accordance with one embodiment of the present invention.

DETAILED DESCRIPTION OF THE EXEMPLARY EMBODIMENTS

Figure 1:
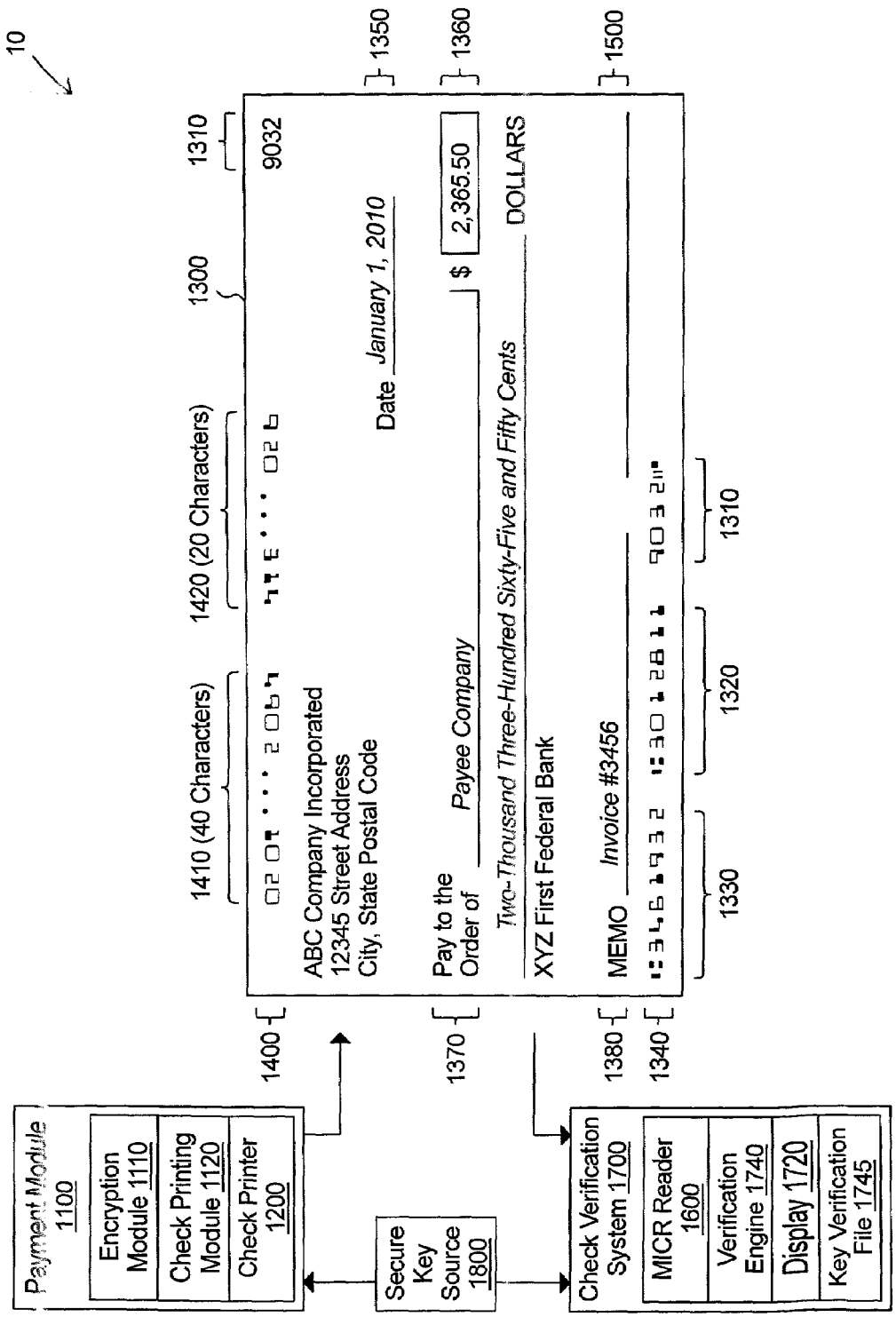
FIG. 1 shows a block diagram showing an exemplary embodiment of the invention.

The present invention is now described in detail with reference to the drawings. In the drawings, each element with a reference number is similar to other elements with the sane reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should also be appreciated that many of the elements discussed in this specification may be implemented in hardware circuit(s), a processor executing software code, or a combination of a hardware circuit and a processor executing code. As such, the term circuit as used throughout this specification is intended to encompass a hardware circuit (whether discrete elements or an integrated circuit block), a processor executing code, or a combination of a hardware circuit and a processor executing code, or other combinations of the above known to those skilled in the art.

The block diagram of FIG. 1 represents an overview of a secure check printing and payment verification system 10 in accordance with a first embodiment of the present invention. The system 10 includes a secure key source 1800, a payment module 1100 for generating a secure check 1300, and a check verification system 1700 for verifying the authenticity of the payment information printed on the secure check 1300 when the secure check 1300 is presented for payment.

The payment module 1100 may be securely located a payer's check printing facility. The check verification system 1700 may be located at each of a plurality of banks retail establishments, check cashing establishments, or other check cashing service provider locations where the secure check 1300 may be presented for payment.

In operation, the payment module 1100 receives payment instructions from an accounts payable system (not shown) for issuing a check payment. The instructions include at least identification of the payee and the payment amount.

The payment module 1100 also receives a pair of keys for an asymmetric encryption algorithm from the secure key source 1800. The first key of the key pair, the private encryption key, may be used to encrypt information using the asymmetric encryption algorithm and the second key of the key pair, the public decryption key, may be used to decipher information encrypted with the first key.

As will be discussed later, this asymmetric encryption system is such that the public decryption key 1420 may be readily used to decipher the encrypted numerical sequence

1410, however, it would be computationally infeasible to use the public decryption key 1420 to either generate an encrypted numerical sequence that could in turn be deciphered by the decryption key 1420 or to derive the private encryption key that is capable of generating the encrypted numerical sequence 1410.

The payment module uses the private encryption key to encrypt critical check information such as the name of the payee and the amount into an encrypted numeric sequence that can be deciphered using the public decryption key. The critical check information includes information that is most commonly altered on a check to fraudulently obtain money such as the name of the payee and the amount of the check. The payment module 1100 then prints the secure check 1300.

The secure check 1300, as printed by the payment module 1100, includes typical payment information in a typical check format such as: (i) an identification of the routing code 1330, account number 1320, and check number 1310 printed in MICR ink and MICR font within a MICR zone across the bottom edge 1340 of the secure check 1300; (ii) an identification of the payee 1370 printed following a "pay to the order of" designation; (iii) an identification of the amount 1360 printed in both numeric digits and in script; (iv) a date 1350; (v) a check number; (vi) and a memo field 1380. In addition to these typical fields, the secure check 1300 includes the encrypted numerical sequence 1410 approximately 40 numeric characters in length and a numerical representation of the public decryption key 1420 approximately 20 numeric characters in length (which can be used to represent a 64-bit value of $K_{public}$ which is discussed later herein). In the exemplary embodiment, the encrypted numeric sequence 1410 and the public decryption key 1420 may be printed in MICR ink and MICR font upside down and backwards within an upper MICR zone 1400 across the top edge of the check.

More specifically, the upper MICR line 1400 may be printed in an inverted relationship to the lower MICR line 1340, so that its reading may be facilitated by passing the check upside-down through the MICR reader 1600, which is designed to read uninverted MICR font printed within the MICR zone close to the check edge. Note that a secure check 1300 as disclosed herein may be used just like any traditional check. The addition of the upper MICR line 1400, while it enables functionality discussed herein, has not diminished the essential ordinary utility of the check. The upper MICR line 1400 may be ignored by the bearer and casher of the check, who may simply cash or deposit the check like any other in accordance with commonly used check processing techniques.

The check verification system 1700 receives a list of valid decryption keys from the secure key source 1800. When the check verification system 1700 receives a secure check 1300 presented for cashing, its upper MICR line 1400 may be electronically read by the check verification system 1700 to obtain the encrypted numeric sequence 1410 and the public decryption key 1420. The check verification system 1700 may than verify that the public decryption key 1420 matches a list of valid public decryption keys and then may use the public decryption key 1420 to decipher and display the critical payment information encoded into the encrypted numeric sequence 1410.

After the critical payment information is displayed, the operator of the check verification system 1700 pay compare the critical payment information to the payment information on the face of the check to verify that the payment information on the face of the check has not been altered.

Because the public decryption key 1420 may be readily used to decipher the encrypted numerical sequence 1410, but does not feasibly operate to either generate an encrypted numerical sequence that could in turn be deciphered by the decryption key 1420 or to derive the private encryption key that is capable of generating the encrypted numerical sequence 1410, one has no feasible ability to alter the encrypted numeric sequence 1410 such that when deciphered utilizing the public decryption key 1420, the deciphered result is controllable. Or, stated another way, one could alter the payment information on the face of the check, but one has no feasible ability to alter the encrypted numeric sequence such that when deciphered, the critical payment information matches the altered check information.

A more detailed description of the above described systems and methods is included herein Secure Key Source and Asymmetric Encryption Algorithm The secure key source 1800 is responsible for distributing a unique key pair for operating an asymmetric encryption algorithm to each payment module 1100 that is registered with the secure key source and is responsible for distributing a list of valid decryption keys (e.g. list of each decryption key that has been assigned to a payment module 1100) to each check verification system 1700. The distribution of the key pairs and the list of valid decryption keys may be by any secure distribution technique whether utilizing a secure network or secure connections over the Internet.

The security of the present invention is based on use of an algorithm wherein the private encryption key is used to encrypt check information, the public decryption key is available on the face of the check for decrypting the check information, the ability to verify the validity of the public decryption key by matching it to a list of assigned and valid public decryption keys, the computational infeasibility of deriving the private key from the public key, and the computational infeasibility of encrypting check information using the public key, and the maintenance of security of the private key.

An example of an asymmetric algorithm useful in the practice of the present invention is the RSA asymmetric encryption algorithm first developed in 1977 wherein a non-negative integer $X_{text}$ less than n may be encrypted into cyphertext $X_{encrypted}$ using a first private key $(n, K_{private})$ and the asymmetric algorithm $X_{encrypted} = ((X_{text})^{K_{private}}) \mod n$. $X_{encrypted}$ may then be deciphered to yield $X_{text}$ using the asymmetric algorithm and a second or public key $(n, K_{public})$ (e.g. $X_{text} = ((X_{encrypted})^{K_{public}}) \mod n$.

The relationship between $K_{private}$ and $K_{public}$ is such that $K_{private}$ can not be derived from $k_{public}$ in a computationally feasible manner. More specifically, if two large prime numbers a and b are chosen, the product of a and b is readily calculated and is used as the value n in the algorithm. It is also known that the quantity (q) of positive integers less than n that are relatively prime to n (including 1) is equal to the product $(a-1)*(b-1)$. As such, q is also readily calculated so long as a and b are known. However, factorization of n is computationally infeasible and as such, derivation of a, b, or q from the value n is computationally infeasible.

The public key $K_{public}$ for use with the algorithm is selected as any integer value that is relatively prime to q. The private key, $K_{private}$, is the multiplicative inverse of $K_{public}$, modulo q. As such, because it is computationally infeasible to derive q from n or $K_{public}$, it thus computationally infeasible to derive $K_{private}$ from n or $K_{public}$.

Software that operates the RSA asymmetric encryption algorithm (or derivatives thereof and other asymmetric encryption algorithms) is currently available from RSA Security, Inc located at 174 Middlesex Turnpike, Bedford, Mass. 01730.

Based on the above algorithm, the asymmetric algorithm is distributed to all payment modules 1100 and check verification systems 1700. The secrecy of a, b, and q is maintained by the secure key source 1800. A unique key pair consisting of $K_{public}$ and $K_{private}$ (and its corresponding n) is assigned to each payment module 1100. The secrecy of $K_{private}$ is maintained by both the secure key source 1800 and the payment module 1100. A list of all public keys ($K_{public}$ and its corresponding n) assigned to a payment module 1100 is distributed to each check verification system 1700.

To provide for distribution of the key pairs to each registered payment module 1100 and for distribution of a list of valid public decryption keys to each registered check verification system 1700, the secure key source 1800 may maintain a secure key source file 6000 as shown in the table of FIG. 6.

The secure key source file 6000 may include a unique record 6060 identified for each registered payment module 1100. Each record includes an ID field 6010 in which the registered payment module 1100 is identified, a field 6020 in which the value n assigned to the payment module 1100 is stored, a field 6030 in which the value $K_{private}$ assigned to the payment module 1100 is stored, a field 6040 in which the value $K_{public}$ assigned to the payment module 1100 is stored, and a field in which a combination of either the account number or the ABA routing number and account number associated with the payment module 1100 is stored.

Payment Module

Returning to FIG. 1, the payment module 1100 comprises an encryption module 1110, a check printing module 1120, and a check printer 1200.

The check printing module 1120 receives the payment information from the accounts payable system and generates the applicable printer file for output to the check printer 1200.

Figure 2:
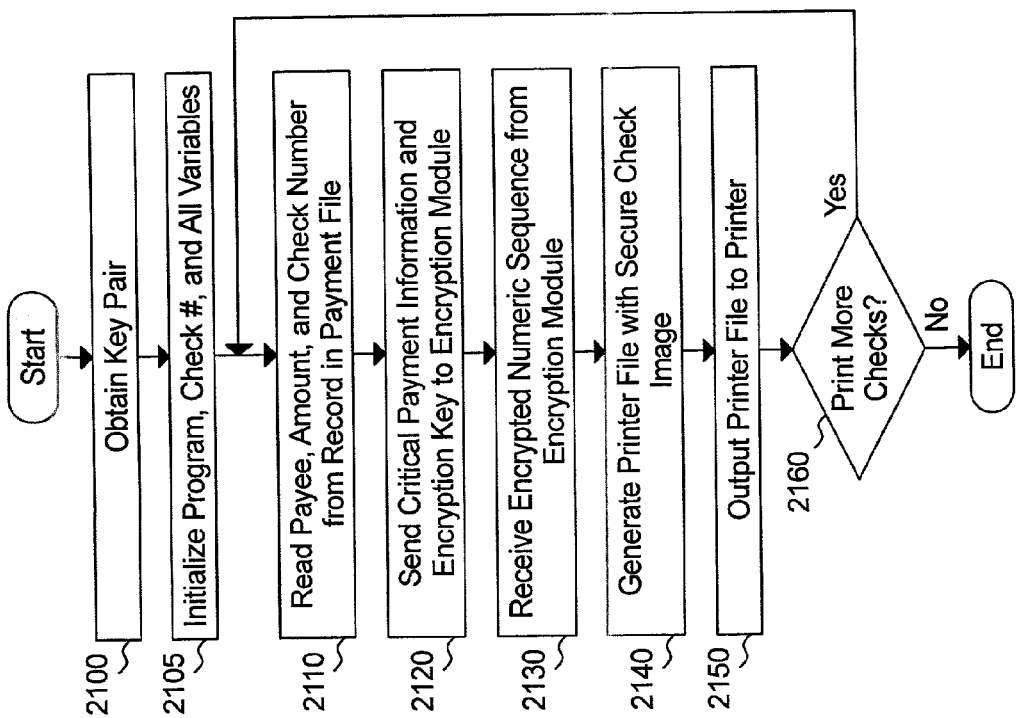
FIG. 2 is a flowchart representing operation of a payment module in accordance with an exemplary embodiment of the present invention.

FIG. 2 shows a flowchart representing exemplary operation of the check printing, module 1120 in accordance with a one embodiment of the present invention. Referring to FIG. 2 in conjunction with FIG. 1, step 2100 represent receiving a key pair (e.g. n, $K_{private}$, and $K_{public}$) from the secure key source 1800. Step 2105 represents initializing the check printing module 1120 to print a sequence of one or more secure checks 1300. Such initialization may include setting of the check number and all appropriate check printing variables, including, but not limited to, those corresponding to an applicable checking account routing code 1330, account number 1320, check number 1310, and the decryption key 1420 that has been assigned to the payment module 1100 by the secure key source 1800.

Step 2110, represents the check printing module 1120 reading the payee, the amount, and other payment information from the appropriate record in the payment file received from the accounts payable system.

Step 2120 represents sending the critical payment information and the private encryption key (e.g. n and $K_{private}$) to the encryption module 1110 and step 2130 represents receiving the encrypted numerical sequence 1410 back from the encryption module 1100.

Step 2140 represents generating a printer file that includes the image of the secure check 1300 and step 2150 represents sending the printer file to the printer 1200.

Step 2160 represents a determination of whether there are more checks to print. If yes, the check printing module 1120 returns to step 2110 where it obtains payment information for another check. Alternatively, if there are no more checks to print, the check printing module 1120 ends.

The encryption module 1100 operates the asymmetric encryption algorithm and performs various data compression steps that together provide for the encryption module, 1100 to receive the critical payment information and the private encryption key, compress and encrypt the critical payment information into a string of numerical characters approximately 40 characters in length (e.g. the encrypted numerical sequence 1410) using the encryption key ($K_{private}$ and n) and return the encrypted numerical sequence 1410 back to the check writing module 1120.

Figure 3:
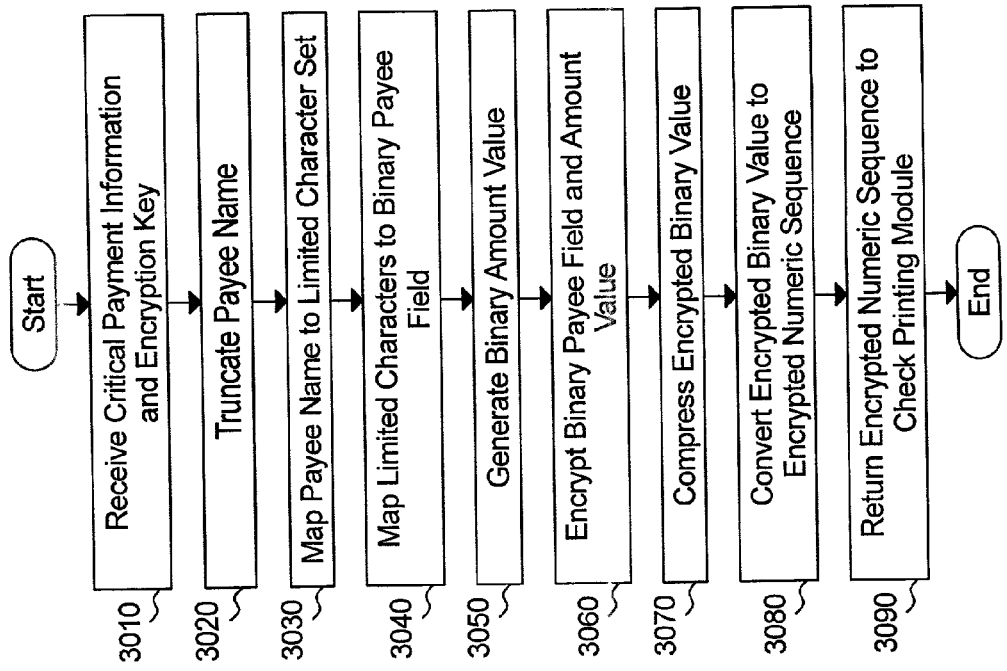
FIG. 3 is a flowchart representing operation of an encryption module in accordance with an exemplary embodiment of the present invention.

Referring to FIG. 3 in conjunction with FIG. 1, operation of the encryption module 1100 is shown. Step 3010 represents the encryption module 1100 receiving the critical payment information and the private encryption key from the check printing module 1120. As previously discussed, the critical payment information may include the name of the payee and the amount of the payment. The name of the payee and the amount of the payment may be an alpha numeric string in excess of 100 ASCII characters in length. Because encryption does not alter string length, the encrypted value will be an ASCII character string of the same length. Because MICR font only supports numeric characters 0–9, because MICR font has a fixed font size, and because the physical size of the secure check 1300 is limited, it is not possible to print such an encrypted value on the face of the secure check 1300 in MICR font across the top of the check Therefore, step 3020 represents a first compression step wherein the payee string is truncated to the first 40 characters.

Because each character of an ASCII character set corresponds to an 8-bit value, the first 40 characters would correspond to a 320-bit binary string. Approximately 100 numeric characters would be required to represent a 320-bit binary string which again remains too long of a string to print on the top of the secure check 1300 in MICR font. There ore, step 3030 represents a second compression step wherein each of the first 40 ASCII characters is mapped to a character from a limited character set having 64 or fewer characters utilizing a mapping table such as that shown in FIG. 4. It should be appreciated that the mapping table of FIG. 4 maps each of the 256 possible ASCII characters in column 4010 to a character from a limited character set in column 4020.

The limited character set includes each of the numeric digits, upper case letters only, and some commonly used characters such as the space, period, and comma. Characters in the ASCII character set that correspond to characters in the limited character set are mapped to such characters, lower case letters in the ASCII character set are mapped to upper case letters in the limited character set, and other remaining ASCII characters simply map to an underscore. Because the limited character set of FIG. 4 has fewer than 64 characters, each character can be mapped to a 6-bit binary value as set forth in column 4030.

Step 3040 represents assembling a binary payee field by mapping each limited character to its 6-bit binary value and sequencing each such binary value into a 240-bit binary payee field. Step 3050 represents generating a 14-bit binary amount value and appending such binary amount value to the end of the 240-bit binary payee field to yield a 254 bit binary field.

The systems and methods of the present invention are most useful for check amounts less than $10,000. While the invention may be useful for checks greater than $10,000, such checks are not typically cashed without the casher maintaining some recourse against the payee should the check be dishonored. Because any whole dollar amount less than $10,000 may be represented by a 14-bit binary value, the binary amount value will be a 14-bit value.

Step 3060 represents encrypting the 254-bit field to obtain an encrypted binary value that is 254-bits in length utilizing the encryption key. Following encryption, yet a third compression step may be performed at step 3070. The third compression step may include utilizing a known binary file compression algorithm such as WINZIP® available from Microsoft® or another known compression algorithm that will compress the 254-bit sequence by approximately 50% or greater yielding a compressed bit sequence on the order of 128 bits.

Step 3080 represents converting the compressed bit sequence to a base-10 number such that it can be represented by a sequence of numerals (0–9) that is approximately 40 numerals in length. Such base-10 number is the encrypted numerical sequence that is returned to the check printing module 1120 at step 3090.

The check printer 1200 may be any commercially available MICR ink laser check printer that has the capability of printing the secure check 1300 on blank check stock in accordance with a printer filed delivered by the check printing module 1120.

Check Verification System

The check verification system 1700 includes a MICR reader 1600, a verification engine 1740, a decryption key verification file 1745, and a display 1720.

The MICR reader 1600 may be similar to many commercially available MICR readers, such as, for but one example, the SCANTEAM 8300 MICR Check Reader, available form Welch-Allyn, of Skaneateles Falls, N.Y. Such a MICR reader will read the MICR numbers located near the edge of the check when such check is inserted into the MICR reader and present the sequence of numerals to the verification engine 1740.

To verify the secure check 1300, the operator of the check verification system 1700 will insert the top edge of the secure check 1300 into the MICR reader 1600 such that the MICR reader 1600 will read the sequence of numbers representing the encrypted numeric sequence 1410 and the decryption key 1420. As such, the encrypted numeric sequence 1410 and the decryption key 1420 will be presented to the verification engine 1740.

The verification engine 1740 obtains a file of valid decryption keys (valid values of $K_{public}$ and n), verifies the validity of the decryption key 1420 printed on the face of the secure check 1300, operates the asymmetric algorithm, and performs data decompression steps that together generate a representation of the payee name and the check amount that were originally compressed and encrypted into the encrypted numeric sequence 1410 on the display 1720.

The flowchart of FIG. 5 represents exemplary operation of the verification engine 1740.

Step 5010 represents validating the public decryption key (e.g. value of $K_{public}$) printed on the face of the secure check 1300 by comparing such value to a file that includes a list of valid decryption keys form the secure key source 1800. The file may be in the format of the decryption key verification file 7000 of FIG. 7. The decryption key verification file 7000 includes a record 7050 for each valid decryption key value $K_{public}$. The record 7050 includes a field 7010 in which the value $K_{public}$ is identified, a field 7020 in which the value n associated with the value $K_{public}$ is identified, a field 7030 in which one or more of the account number and the ABA routing number associated with the payment module 1100 to which the value $K_{public}$ associates with is identified; and a filed 7040 that may identify the name of the company to which the payment module 1100 is registered.

Returning to FIG. 5, 5020 represents recovering the compressed bit sequence by converting the encrypted numeric sequence 1410 to its binary equivalent.

Step 5030 represents recovering the encrypted binary value by decompressing the compressed bit sequence utilizing a decompression scheme that corresponds to the compression scheme utilized to compress the encrypted binary value at step 3080 of FIG. 3.

Step 5040 represents recovering the binary value (including the binary payee field and the binary amount field) by decrypting the encrypted binary value utilizing the decryption key ($K_{public}$ as printed on the face of the check and the value n as looked up from the decryption key verification file) and the asymmetric algorithm.

Step 5050 represents recovering the amount of the secure check 1300 (truncated to a whole dollar amount) by converting the binary amount field to its base-10 numeric equivalent.

Step 5060 represents recovering an ASCII representation of the first 40 characters of the payee name by mapping each 6-bit segment of the binary payee field to its corresponding character within the limited character set and then mapping each limited character to its corresponding ASCII character utilizing the mapping table of FIG. 4.

Step 5070 represents sending the recovered amount and recovered payee ASCII payee representation to the display 1720 for viewing by the operator of the check verification point of cashing system 1700. It should be appreciated that although the amount field on the secure check 1300 may include upper case and lower case letters along with any other ASCII characters and the corresponding first 40 characters of the recovered payee representation will include upper case alpha characters in place of lower case alpha characters and will include an underscore in place of the less commonly used ASCII characters, the recovered payee representation should still be adequate to detect that the payee field has not been altered to represent a different payee It should be appreciated that the above described systems and methods provide for a secure check 1300 to include an unalterable encrypted representation of critical payment information such as the payee name and the amount on the face. As such, a check verification point of cashing system can be used to display a representation of such critical check information such that a facility providing check cashing services can verify that a payee name, amount, or other critical check information has not been altered prior to presenting the check for cashing.

Although the invention has been shown and described with respect to certain preferred embodiments, it is obvious that equivalents and modifications will occur to others skilled in the art upon the reading and understanding of the specification. For example, for simplistic mapping of ASCII characters to the binary value, each character is mapped to a 6-bit binary value. However, if the limited character set consists 40 or fewer characters (10 numeric, 26 alpha, and 4 or fewer punctuation characters) a more complex mapping algorithm could be used such that each character is represented by fewer than 6-bits. The present invention includes all such equivalents and modifications, and is limited only by the scope of the following claims.

What is claimed is:

1. A method of operating a secure check printing system for printing an unalterable negotiable instrument, the method comprising:
   receiving payment information to include on the negotiable instrument, the payment information including a payee name and an amount;
   encrypting a representation of the payment information to generate an encrypted value utilizing an asymmetric algorithm and a first key; and
   generating a print file for delivering to printer for printing, onto blank check stock, the payment information, a representation of the encrypted value, and a second key to create a face of the negotiable instrument, the second key being different than the first key but mathematically related to the first key such that deciphering the encrypted value utilizing the asymmetric algorithm and the second key yields the representation of the payment information;
   wherein the step of generating a print file for delivery to a printer comprises:
      converting the encrypted value to a numeric character sequence comprising exclusively numerals and including the numeric character sequence in the file such that the printer prints, onto blank check stock, the payment information, the numeric character sequence, and the second key on face of the negotiable instrument; and
      including the numeric character sequence and the second key in MICR font positioned such that it is printed upside down across the top of the negotiable instrument.

2. A method of operating a secure check printing system for printing an unalterable negotiable instrument, the method comprising:
   receiving payment information to include on the negotiable instrument, the payment information including a payee name and an amount;
   encrypting a representation of the payment information to generate an encrypted value utilizing an asymmetric algorithm and a first key; and
   generating a print file for delivering to printer for printing, onto blank check stock, the payment information, a representation of the encrypted value, and a second key to create a face of the negotiable instrument, the second key being different than the first key but mathematically related to the first key such that deciphering the encrypted value utilizing the asymmetric algorithm and the second key yields the representation of the payment information;
   wherein the step of encrypting a representation of the payment information to generate an encrypted value comprises compressing the payee name to generate the representation of the payment information;
   wherein compressing the payee name comprises:
      truncating the payee name to a truncated payee name that comprises a sequence of characters shorter than a sequence of characters representing the payee name; and
      mapping each character of the truncated payee name to a limited character set; and
   wherein the step of generating a print file for delivery to a printer comprises converting the encrypted value to a numeric character sequence comprising exclusively numerals and including the numeric character sequence in the file such that the printer prints, onto blank check stock, the payment information, the numeric character sequence, and the second key on face of the negotiable instrument.

3. The method of claim 2, wherein the step of generating a print file for delivery to a printer comprises including the numeric character sequence and the second key in MICR font positioned such that it is printed upside down across the top of the negotiable instrument.

4. A method of operating a check verification system to determine whether a payee name and a payee amount printed on a negotiable instrument have been altered, the method comprising:
   electronically reading an encrypted representation of a payee name and a payment amount from the negotiable instrument; and
   electronically reading a decryption key from the negotiable instrument, the decryption key being:
      mathematically related to an encryption key that was used to generate the encrypted representation;
      different than the encryption key, and
      operating exclusively with an asymmetric algorithm for decryption of an encrypted value generated using the asymmetric algorithm and the encryption key;
   decrypting the encrypted numeric sequence to obtain a representation of the payee name and the payment amount;
   generating a visible display of the representation of the payee name and the payment amount whereby the representation of the payee name and the payment amount may be compared to a payee name and a payment amount printed on the negotiable instrument; and
   wherein the step of electronically reading an encrypted representation and the step of electronically reading a decryption key both comprise using a MICR reader to electronically detecting MICR font that:
      is printed representing upside down across the top of the negotiable instrument; and
      represents the encrypted representation and decryption key.

* * * * *